Dec. 10, 1957   L. E. SCHNEIDER   2,815,539
KITCHEN
Filed Feb. 1, 1957   3 Sheets-Sheet 2

INVENTOR:
Louis E. Schneider,
BY Cushman Darby & Cushman
ATTORNEYS.

Dec. 10, 1957 L. E. SCHNEIDER 2,815,539
KITCHEN
Filed Feb. 1, 1957 3 Sheets-Sheet 3
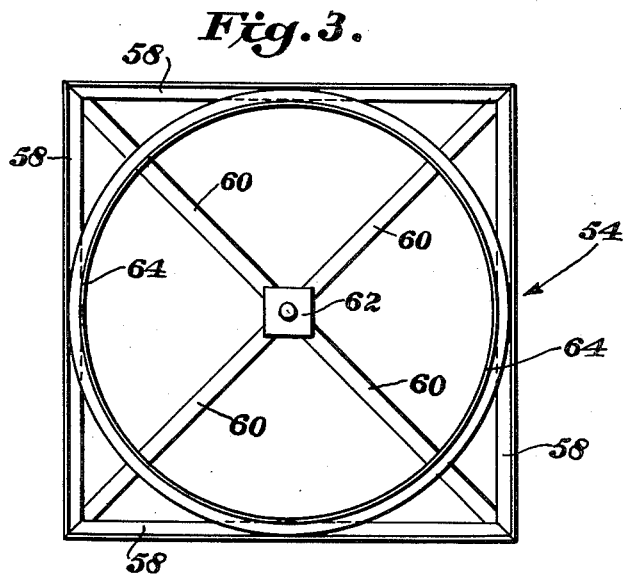
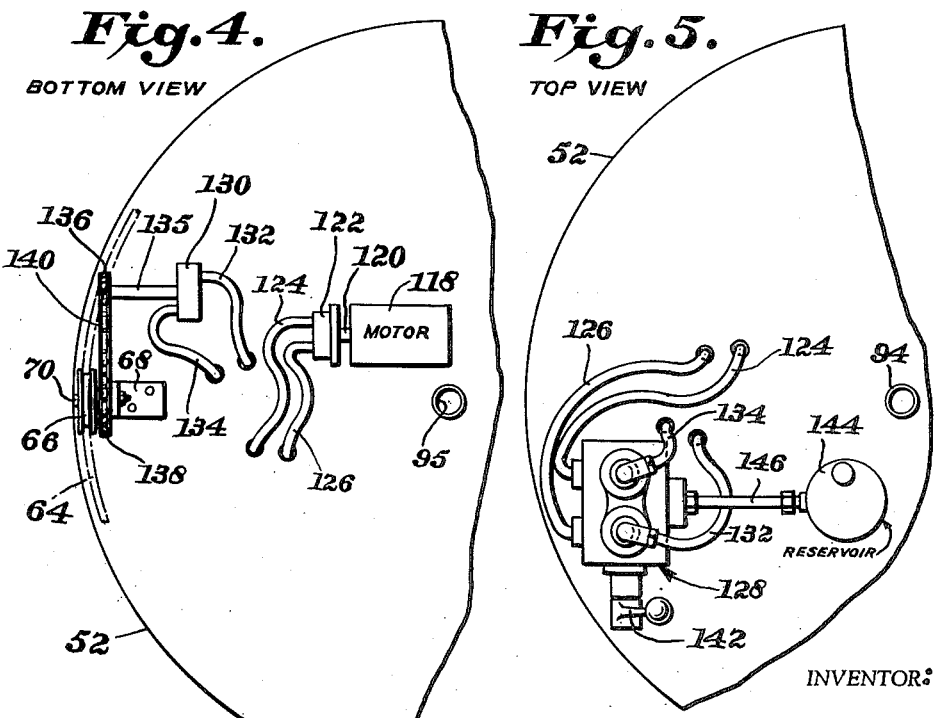
INVENTOR:
Louis E. Schneider,
BY
Cushman Darby Cushman
ATTORNEYS.

United States Patent Office 2,815,539
Patented Dec. 10, 1957

2,815,539

KITCHEN

Louis E. Schneider, Hereford, Tex.

Application February 1, 1957, Serial No. 637,818

14 Claims. (Cl. 20—1)

The present invention relates to commercial eating establishments and particularly to a kitchen assembly particularly adapted for use in such establishments.

An important object of the present invention is to provide a novel kitchen assembly for use in commercial eating establishments or restaurants, greatly facilitating customer service.

Another object is to provide a rotating kitchen assembly for restaurants so that food prepared in the kitchen may be carried thereby to the attendants or waitresses, thereby eliminating the usual time and inconvenience involved in walking back and forth into and out of the kitchen. In this manner, a relatively small number of attendants or waitresses can expeditiously handle the entire food service for a large number of customers, thus minimizing operating costs.

A further object is to provide a rotating kitchen of generally circular outline combined with an enclosing annular table arrangement on a stationary floor to define an annular service aisle from which the tables and kitchen are readily accessible.

A still further object resides in an improved restaurant construction utilizing a minimum of floor space and adapted for economical and efficient operation.

Further objects and advantages of the invention will be in part obvious and in part pointed out hereinafter.

The novel features of the invention may be best made clear from the following description and accompanying drawings in which:

Figure 3 is a top plan view of an exemplary embodiment of a supporting structure for the kitchen;

Figure 4 is a fragmentary bottom plan view of the right-hand portion of the base of the kitchen of Figure 1 showing an exemplary embodiment of driving means for the kitchen; and Figure 5 is a fragmentary top plan view of that portion of the base of the kitchen shown in Figure 4 with certain parts thereon removed.

Figure 1:
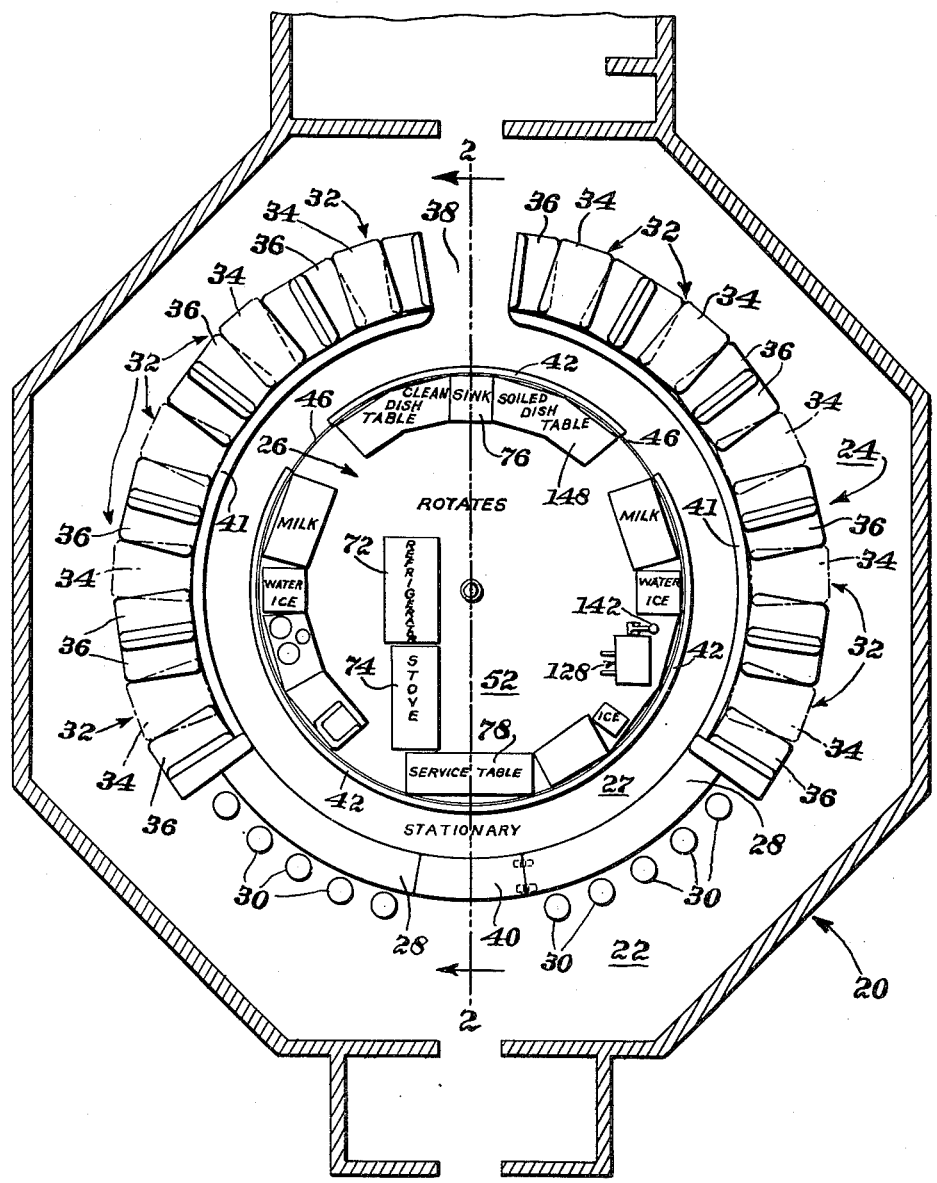
Figure 1 is a top plan view of a restaurant embodying the invention.

Referring to the drawings in detail, a restaurant 20 embodying the invention is illustrated in Figure 1. The restaurant may be of any desired size and configuration having a stationary floor 22 on which there may be disposed a table arrangement 24. The floor 22 preferably is formed with a relatively large, circular central opening 25 spaced inwardly of the table arrangement 24 and in which is arranged a kitchen assembly 26 defining with the table arrangement a service aisle 27. The table arrangement 24 may be of any suitable construction preferably defining a generally circular outline and for purposes of illustration, it will be described as including a circularly arcuate counter portion 28 and stools 30 disposed outwardly thereof, combined with a plurality of circumferentially spaced booths 32. Each booth may include the conventional table 34 and benches or seats 36. It will be understood that the table arrangement 24 may include only booths 32 or counter 28.

The table arrangement 24 preferably extends substantially completely around the kitchen assembly 26 whereby the aisle 27 will also be of circular or annular outline. Any desirable number of exit and entrance passageways may be provided in the table arrangment as at 38 between the booths 32 and also in the counter 28 where an upwardly swinging door portion 40 may be formed for such purpose. An arcuate wall portion 41 preferably is disposed inwardly of and adjacent each section of booths 32 on either side of passageway 38. This wall 41 may extend upwardly any convenient distance, as to the height of counter 28, permitting access to the booth tables 34 by attendants or waitresses standing in the aisle 27.

Figure 2:
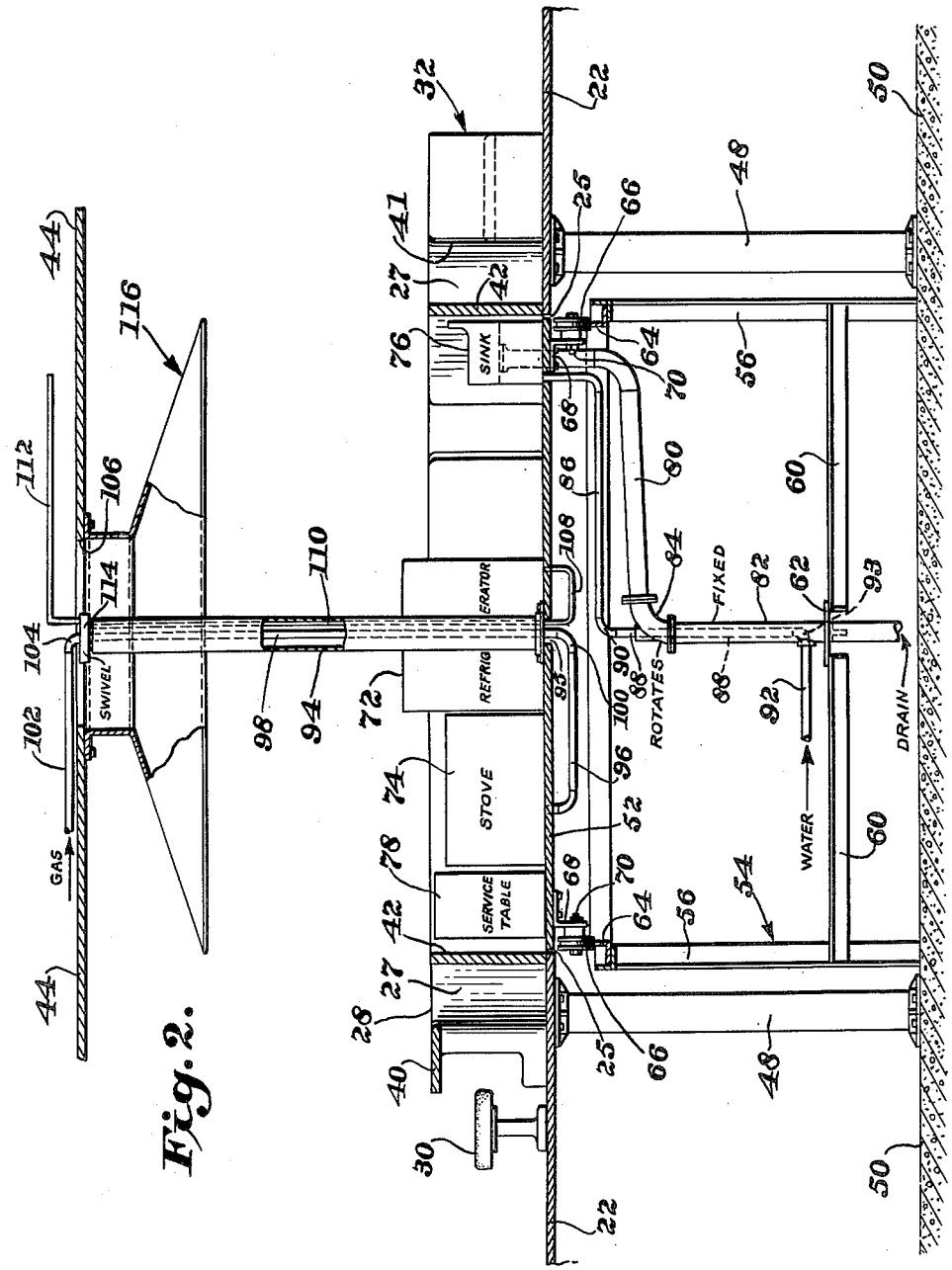
Figure 2 is a vertical sectional view taken generally along line 2—2 of Figure 1.

An upwardly extending arcuate wall 42 preferably is arranged on floor 22 at the periphery of the opening 25 therein and may be of a height substantially equal to the height of the wall portions 41 permitting access to the periphery of the kitchen 26 from the aisle 27. It will be understood that this wall 42 may extend upwardly to the ceiling 44 (Figure 2) if desired, and in this case it would be provided with suitably spaced openings for permitting the desired access to the outer kitchen regions from aisle 27. Entrance and exit passageways 46 may be provided at suitable locations in the wall 42. Any suitable structure for supporting floor 22 may be utilized, such as columns 48 extending between a base or cellar floor 50 and the undersurface of floor 22 adjacent opening 25 therein. Other similar columns (not shown) may be provided for supporting other portions of floor 22.

The kitchen assembly 26 preferably includes a disc-like base or floor 52 rotatably supported within opening 25 in generally coplanar relationship with main floor 22. An exemplary construction for rotatably supporting the kitchen base 52 in desired position includes a frame work 54 (Figures 2 and 3) of box-like configuration suitably mounted on the cellar floor 50. Frame work 54 preferably includes four, vertically extending corner leg pieces 56, connected together at their upper ends by four horizontal border pieces 58 and connected together intermediate their ends by four horizontal diagonal pieces 60 joined at their inner ends by an apertured plate 62. All of the frame pieces 56, 58, 60 may be of metallic, angle-iron configuration and suitably joined as by welding. A horizontal circular track 64 is arranged on the horizontal border pieces 58 in generally tangential relationship therewith and conveniently secured thereto as by welding.

A plurality of rollers 66 (such as three or four) preferably are connected to the undersurface of base 52 in equally-spaced angular relationship to define a circle for engagement with track 64. Each of the rollers 66 may be connected to base 52 by means of an angle-piece 68 and horizontal bolt 70, the latter being suitably attached to angle-piece 68 and journalled to its respective roller. The surface of the rollers 66 which engages the track 64 may be formed of any suitable traction material such as rubber or the like for preventing slippage between the rollers and track. As will be explained more fully hereinbelow, a driving means will be engaged to one or more of the rollers 66 for imparting the desired rotation to base 52. In this regard, the rollers 66 and track 64 are so disposed that disc-like base 52 will rotate substantially on its own vertical axis.

Arranged in the kitchen assembly 26 on base 52 will be the usual appliances and devices. For example, a refrigerator 72 and stove or griddle 74 may be disposed on base 52 as seen in Figure 1 while a sink 76 and service table or counter 78 may be disposed adjacent opposite portions of the periphery of the base, the service table 78 being adjacent the stove whereby food prepared on the stove may be conveniently placed on the service table for pick-up by a waitress in the aisle 27. It should be evident that the kitchen 26 will be rotated sufficiently slowly so that transferrals of orders, dishes and the like between service table 78 and the table arrangement 24 may be safely and readily effected.

The various electrical and fluid conduit connections for the refrigerator 72, stove 74 and sink 76, as well as other devices on the base 52 not specifically described, will be provided with swivel joints or connections whereby normal operation of these devices will take place, irrespective of their rotation with base 52. Considering the sink 76, a first generally horizontal drain-pipe section 80 may be connected at one end to the sink in conventional manner and swivelly connected at its other end to a fixed, vertical drain-pipe section 82 by means of swivel joint or elbow 84 whereby the section 80 and swivel joint 84 will rotate bodily with sink 76 about the axis of the fixed section 82, the latter being coaxial with the base 52. The drain section 82 may be fixedly mounted in the apertured plate 62 and connected to the usual discharge plumbing (not shown). Other drainage lines (not shown) may be suitably connected to swivel joint 84.

A horizontal water supply conduit or pipe 86 is connected at one end to the usual faucets (not shown) in the sink 76 while the other end thereof is fixedly connected to a vertical pipe section 88 by means of elbow 90. Conduit 88 may extend through the swivel joint 84 and drain section 82 in coaxial, fluid-sealed relation therewith and preferably is swivelly connected at its lower end to a horizontal inlet conduit 92 extending through drain section 82 by swivel joint 93 whereby pipes 86 and 88 will move with the sink about the axis of fixed drain section 82. It will be understood that the drain pipe sections and supply pipe sections may be suitably spaced and altered so that the fixed pipe section 88 does not engage any part of the drain and additionally, other supply pipes for the sink may be conveniently connected thereto including a swivel joint.

Considering the connections for the refrigerator 72 and stove 74, a hollow vertical cylinder 94 may be coaxially arranged on base 52 for rotation therewith and extending upwardly therefrom in surrounding relation to an aperture 95 in said base. The gas supply conduits for stove 74 may include a horizontal section 96 connected at one end to the stove and at the other end to a vertical section 98 by elbow joint 100. Vertical conduit section 98 preferably is coaxially disposed within cylinder 94 and extends therethrough for swivel connection to a horizontal section 102 by swivel elbow joint 104. Support brackets (not shown) for vertical conduit 98 may be provided within cylinder 94, and the joint 104 may extend through an opening 106 in ceiling 44. As will be evident, the lower joint 100 may be the swivel joint instead of upper joint 104, if desired.

The electrical conductors for refrigerator 72 may include a horizontal section 108 connected at one end to the refrigerator and at the other end to a vertical section 110 disposed within cylinder 94 and extending upwardly therethrough and also through ceiling opening 106 for swivel connection to a horizontal section 112 by means of a conventional swivel arrangement 114. Swivel 114 may be of the contactor ring and brush type encircling swivel joint 104 and may be swivelly associated with additional conductors (not shown) for other appliances on the base 52. Support brackets (not shown) may be provided in cylinder 94 for vertical section 110. The water and gas conduit sections 92, 102 respectively, as well as conductor section 112 will be respectively connected to suitable water, gas and electrical energy sources (not shown).

For directing undesirable gases or vapors from the kitchen assembly, a large directional shield 116 may be attached to ceiling 44 surrounding the opening 106 therein. Shield 116 may include an upper tubular portion and a lower frusto-conical portion whereby gases rising from the kitchen during cooking, for example, will be directed through opening 106 for discharge through a stack or flue (not shown) to the atmosphere. The gas conduit section 102 and joint 104 as well as the electrical sections 110, 112 and swivel 114 may be protected or shielded from the gases escaping through opening 106 by suitable enclosing casings or housings (not shown).

A preferred embodiment of the driving means for the kitchen base 52 is illustrated in Figures 4 and 5 and includes a conventional electrical motor 118 attached to the undersurface of base 52 and connected to a source of electrical energy by conductors (not shown) swivelly connected to conductor 112 by swivel 114, if desired. A manually operated, on-off switch (not shown) for motor 118 may be arranged on or adjacent the upper surface of base 52. A power take-off shaft 120 from motor 118 is drivingly connected to a hydraulic pump 122 attached to the base 52 and having inlet 124 and outlet 126 lines associated therewith. These lines preferably extend through the base 52 to the upper surface thereof where they are connected to a control valve 128 disposed on the base 52. This valve 128 communicates with a hydraulic motor 130 on the undersurface of base 52 by means of inlet 132 and outlet 134 lines extending from the valve 128 to the motor 130. The motor 130 may also be attached to base 52 and a take-off shaft 135 from motor 130 is drivingly connected to a driving sprocket wheel 136, disposed adjacent one of the rollers 66. A larger driven sprocket wheel 138 is drivingly connected coaxially to the adjacent roller 66 on bolt 70 and is drivingly engaged to sprocket wheel 136 as by chain 140.

The valve 128 may be of any conventional type for permitting reversal of the flow through the lines 132, 134 to motor 130 by manipulation of lever 142 whereby the direction of rotation of take-off shaft 135 will also be reversed. A hydraulic fluid reservoir 144 may be disposed on base 52 communicating with the lines 124, 126, 132, 134 through the valve 128 by means of conduit 146.

The operation of the restaurant 20 will now be described. To initiate rotation of the kitchen base 52, the motor 118 is energized and drives the sprocket wheels 136, 138 through the hydraulic pump 122 and motor 130 arrangement. The associated roller 66 is rotated and rolls on track 64 thereby propelling base 52 in its rotary path at a relatively slow angular velocity.

Waitresses or the like will be positioned at various stations in the service aisle 27 and as orders are taken from customers seated at the table arrangement 24 they are deposited on the service table 78 of the kitchen assembly as the latter table rotates or moves to the waitress in question. The attendants stationed in the rotating kitchen prepare the requested orders and deposit them on the service table 78 for movement to and pick-up by the appropriate waitress, who need not move from her station to serve the food to the customer. Soiled dishes, eating utensils and the like may be deposited on service table 78 or on a soiled dish table 148 arranged on base 52 adjacent sink 76, to be cleaned by an additional attendant or attendants stationed in the kitchen.

It will be appreciated that a saving of the time usually spent by waitresses in walking into and out of conventional stationary kitchens for depositing and picking up orders is realized by the rotating kitchen of the invention. Accordingly, a fewer number of waitresses will be able to satisfactorily handle a relatively large number of customers. Moreover, the waitresses will have sufficient time, waiting for previously-deposited orders to be prepared, to keep the tables 34 and counter 28 clean and to provide good, attentive service to the customers in their stations.

It will be further appreciated that numerous types of driving means other than that described may be utilized for rotating the base 52. Additionally, the described manner of rotatably supporting the base 52 with respect to the stationary floor 22 may be varied to dispose the base 52 and floor 22 at different elevations, if desired.

It will thus be seen that the objects of this invention have been fully and effectively accomplished. It will be realized, however, that the foregoing specific embodiment has been shown and described only for the purpose of illustrating the principles of the invention and is subject to extensive change without departure from such principles. Therefore, this invention includes all modifications encompassed within the spirit and scope of the appended claims.

I claim:

1. In a device of the character described: an article carrying assembly including a rotating base, means arranged on said base for storing and preparing food, a stationary floor portion disposed outwardly from said base, a table arrangement mounted on said floor portion in spaced relation to and outwardly of said assembly to define an aisle between said table arrangement and said assembly whereby attendants may operate in said aisle to transfer articles between said assembly and said table arrangement.

2. In a device of the character described, the combination comprising: a kitchen assembly including a rotating base; a stove, sink and refrigerator mounted on said base for rotation therewith; a floor extending outwardly from said kitchen assembly in spaced relation thereto; a table arrangement mounted on said floor in outwardly spaced relation with respect to said kitchen assembly and enclosing at least a part thereof to define an aisle in said floor substantially coextensive with said table arrangement; and seats positioned adjacent said table arrangement.

3. The combination defined in claim 2, wherein the table arrangement is generally annular and substantially completely encloses the kitchen assembly, and wherein the aisle is annular.

4. The combination defined in claim 3, wherein an arcuate vertically extending wall is arranged on the floor adjacent the kitchen assembly.

5. The combination of claim 2, wherein a feed conduit is connected to the sink, and a supply conduit being swivelled to said feed conduit in communication therewith for relative rotation therebetween on the axis of rotation of the kitchen assembly base.

6. The combination of claim 5 wherein a feed pipe is connected to the stove, and a supply pipe swivelled to said feed pipe in communication therewith for relative rotation therebetween on the axis of rotation of the kitchen assembly base.

7. In a device of the character described, the combination comprising: a floor having an opening therein and a generally annular table arrangement mounted on said floor surrounding the opening therein: a kitchen assembly disposed in said opening in spaced relation to said table arrangement to define an annular aisle in said floor between said assembly and said table arrangement; said assembly comprising a base, a supporting structure for said base, means for rotatably mounting said base on said supporting structure, means on said base for storing and preparing food, and means for rotating said base with respect to said supporting means.

8. The combination defined in claim 7 wherein an arcuate vertically extending wall is arranged on the floor adjacent to and substantially enclosing the opening therein.

9. The combination defined in claim 8 wherein the table arrangement includes an arcuate counter portion and seats arranged adjacent said counter portion and outwardly thereof.

10. The combination defined in claim 8 wherein the table arrangement includes a plurality of circumferentially spaced booths, and each of said booths having a table and seats associated therewith.

11. In a device of the character described, the combination comprising: a kitchen assembly including a base and a supporting structure therefor; means for rotatably mounting said base on said supporting structure; means for rotating said base with respect to said supporting structure; a stove, a refrigerator and a sink mounted on said base for rotation therewith; an electrical conductor connected to said refrigerator, a supply conductor swiveled to said first-named conductor; feed conduits connected to said sink and said stove, supply conduits communicating with said feed conduits and swiveled thereto for relative rotation therebetween; a stationary floor extending outwardly from said kitchen assembly in spaced relation to said base and substantially coplanar therewith; an arcuate vertically extending wall mounted on said floor adjacent and substantially enclosing said kitchen assembly; a table arrangement disposed on said floor in outwardly spaced relation to and substantially enclosing said arcuate wall to define an aisle in said floor between said table arrangement and said kitchen assembly.

12. The combination defined in claim 11 wherein the base of the kitchen assembly is generally circular and the table arrangement and the aisle are annular.

13. The combination defined in claim 11 wherein the means for rotatably mounting the base includes; a circular track on the supporting structure, and a plurality of rollers arranged in a circle on the bottom of said base and engaging said track.

14. The combination defined in claim 13 wherein the means for rotating the base comprises: a driving sprocket wheel, and a driven sprocket wheel being coaxially connected to one of the rollers, a chain being trained around said sprocket wheels, and a prime mover drivingly connected to said driving sprocket wheel.

No references cited.